United States Patent
Hayashi

(10) Patent No.: US 8,350,892 B2
(45) Date of Patent: Jan. 8, 2013

(54) IMAGE PICKUP APPARATUS, IMAGE PICKUP METHOD, PLAYBACK CONTROL APPARATUS, PLAYBACK CONTROL METHOD, AND PROGRAM

(75) Inventor: Naoki Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 12/412,935

(22) Filed: Mar. 27, 2009

(65) Prior Publication Data

US 2009/0290013 A1    Nov. 26, 2009

(30) Foreign Application Priority Data

May 20, 2008   (JP) ................................. 2008-132319

(51) Int. Cl.
*H04N 7/00* (2011.01)
(52) U.S. Cl. ........................................................ 348/36
(58) Field of Classification Search ...................... 348/36
See application file for complete search history.

(56) References Cited

U.S. PATENT DOCUMENTS

| | | | | |
|---|---|---|---|---|
| 5,262,867 | A * | 11/1993 | Kojima ............................ | 348/39 |
| 6,661,455 | B1 | 12/2003 | Toyofuku et al. | |
| 6,677,981 | B1 * | 1/2004 | Mancuso et al. ................ | 348/36 |
| 6,788,333 | B1 * | 9/2004 | Uyttendaele et al. ........... | 348/36 |
| 6,885,392 | B1 * | 4/2005 | Mancuso et al. ................ | 348/36 |
| 7,385,624 | B2 * | 6/2008 | Takehara et al. ................ | 348/36 |
| 2001/0005208 | A1 | 6/2001 | Minami et al. | |
| 2007/0182812 | A1 * | 8/2007 | Ritchey ........................... | 348/36 |
| 2009/0273688 | A1 * | 11/2009 | Nonaka et al. ............. | 348/222.1 |

FOREIGN PATENT DOCUMENTS

| | | |
|---|---|---|
| EP | 1 235 182 A2 | 8/2002 |
| JP | 7-212693 | 8/1995 |
| JP | 11-88754 | 3/1999 |
| JP | 11-88811 | 3/1999 |
| JP | 11-146243 | 5/1999 |
| JP | 11-308618 | 11/1999 |

(Continued)

OTHER PUBLICATIONS

Yukinobu Taniguchi, et al., "Panorama Excerpts: Video Cataloging by Automatic Synthesis and Layout of Panoramic Images", IEICE Transactions on information and Systems, vol. E83-D, No. 12, XP009093074, Dec. 1, 2000, pp. 2039-2046.
Extended European Search Report issued Jan. 10, 2011 in EP 10 18 8890.
Office Action issued Apr. 26, 2011, in Japan Patent Application No. 2009-182595.

(Continued)

*Primary Examiner* — Minh-Chau Nguyen
(74) *Attorney, Agent, or Firm* — Oblon, Spivak, McClelland, Maier & Neustadt, L.L.P.

(57) ABSTRACT

An image pickup apparatus includes an image pickup unit configured to convert an image input through a lens system into image data, a stitching unit configured to generate a panoramic image from a plurality of the image data items of images captured during a time period from when a panoramic image capture is started to when the panoramic image capture is ended, an imaging direction detecting unit configured to detect an imaging direction during the time period from when a panoramic image capture is started to when the panoramic image capture is ended, a clock unit configured to detect image capture time information regarding image capture times of the panoramic image, and a recording unit configured to record, in association with the panoramic image generated by the stitching unit, the image capture time information detected by the clock unit and the imaging direction detected by the imaging direction detecting unit.

19 Claims, 9 Drawing Sheets

FOREIGN PATENT DOCUMENTS

| | | |
|---|---|---|
| JP | 2002-77800 | 3/2002 |
| JP | 2005-333396 | 12/2005 |
| JP | 2006-295723 | 10/2006 |
| JP | 2006-304090 | 11/2006 |
| JP | 2007-20029 | 1/2007 |
| JP | 2007-336422 | 12/2007 |
| JP | 4479829 | 6/2010 |
| JP | 4862926 | 1/2012 |

OTHER PUBLICATIONS

Communication from European Patent Office issued Sep. 29, 2011, in Patent Application No. 09 156 828.7.

Japanese Office Action mailed Jul. 3, 2012, in Japanese Patent Application No. 2011-133361.

* cited by examiner

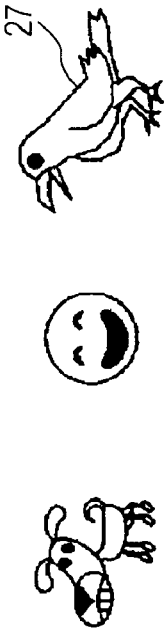
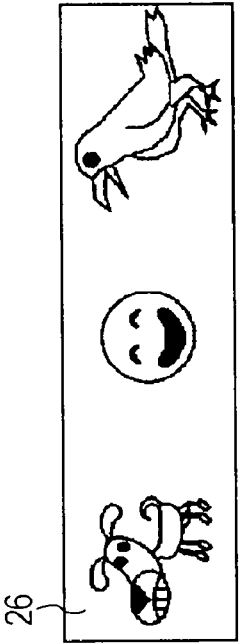
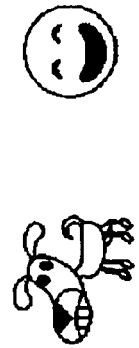
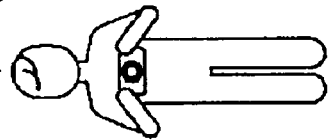
FIG. 3A
FIG. 3B

PANORAMIC IMAGE AND DISPLAY AREA

DISPLAYED IMAGE

END OF PANORAMIC IMAGE

IMAGE PICKUP APPARATUS, IMAGE PICKUP METHOD, PLAYBACK CONTROL APPARATUS, PLAYBACK CONTROL METHOD, AND PROGRAM

BACKGROUND OF THE INVENTION

1. Field of the Invention

The present invention relates to an image pickup apparatus for capturing an image while moving the image pickup apparatus so as to generate a panoramic image, an image pickup method, a playback control apparatus, a playback control method, and a program.

2. Description of the Related Art

In order to capture an image, widely used electronic still cameras can receive light from an object via a lens and convert the received light to an imaging signal using a solid-state image pickup element, such as a charge coupled device (CCD). Subsequently, the electronic still cameras can record the imaging signal on a recording medium and play back the recorded image signal. In addition, a large number of electronic still cameras include a monitor that displays a captured still image. The electronic still cameras select a particular one of the recorded still images and display the selected image on the monitor. In such electronic still cameras, the image capturing area captured in a single shot is a narrow area restricted by the field of view of the lens. Thus, it is difficult to capture a capturing area wider than the field of view of the lens. Accordingly, in recent years, a variety of camera systems that can capture a panoramic image have been developed.

For example, these camera systems fall in two categories: multi-lens camera systems that capture a wide-angle image at one time using a plurality of lenses and single-lens camera systems that continuously capture an image using a single lens while sequentially changing the image capturing direction. The multi-lens camera systems have an advantage that an entire panoramic image can be captured in substantially the same manner as that of an ordinary camera. However, the multi-lens camera systems have a disadvantage that the cost of the entire system is increased.

In contrast, the single-lens camera systems can capture a panoramic image at relatively low cost. Several techniques for capturing images while changing the image capturing direction have been developed. For example, a technique for shifting or rotating an image capturing system by hand at a constant speed has been developed (refer to, for example, Japanese Unexamined Patent Application Publication No. 11-88754). In addition, a technique for repeatedly shifting or rotating and stopping an image capturing system by hand has been developed (refer to, for example, Japanese Unexamined Patent Application Publication No. 11-88811). Furthermore, a technique for shifting or rotating and stopping an image capturing system using a stepping motor has been developed (refer to, for example, Japanese Unexamined Patent Application Publication No. 2005-333396).

In order to enjoy looking at a panoramic image captured using one of the above-described techniques, a landscape printing method (refer to, for example, Japanese Unexamined Patent Application Publication No. 7-212693) and a scroll playback method using a television monitor (refer to, for example, Japanese Unexamined Patent Application Publication No. 2002-77800) have been developed. For example, when displaying an entire panoramic image on a television monitor, a small landscape image is displayed in a partial area of the television screen. Accordingly, it is difficult for a user to look at the detailed image. In addition, when a user wants to sequentially and automatically display a plurality of panoramic images, it is difficult for a user to look at the detailed image, since a small landscape image is displayed in a partial area of the television screen. Therefore, when a plurality of panoramic images are continuously displayed on a television monitor, the details of the entire panoramic image can be examined by scrolling the playback panoramic images.

SUMMARY OF THE INVENTION

However, in the techniques described in Japanese Unexamined Patent Application Publication Nos. 11-88754, 11-88811, and 2005-333396, images captured at different times are assembled. Accordingly, a time difference occurs in a screen of an assembled panoramic image. Consequently, even when one image capture time is recorded in association with the assembled panoramic assembled image, an accurate time at which the panoramic image is captured is not recorded. As a result, it is difficult to recognize a change in time in the assembled panoramic image and a change in the image capture direction.

In addition, since, in the existing techniques, images to be scroll played back are determined using only one method, it is difficult to enjoy looking at a panoramic image efficiently.

Accordingly, the present invention provides an image pickup apparatus and an image pickup method for generating an assembled panoramic image capable of indicating changes in an image capture time and an imaging direction, and a playback control apparatus, a playback control method, and a program suitable for allowing a user to continuously and efficiently enjoy looking at panoramic images.

According to an embodiment of the present invention, an image pickup apparatus includes an image pickup unit configured to convert an image input through a lens system into image data, a stitching unit configured to generate a panoramic image from a plurality of the image data items of images captured during a time period from when a panoramic image capture is started to when the panoramic image capture is ended, an imaging direction detecting unit configured to detect an imaging direction during the time period from when a panoramic image capture is started to when the panoramic image capture is ended, a clock unit configured to detect image capture time information regarding image capture times of the panoramic image, and a recording unit configured to record, in association with the panoramic image generated by the stitching unit, the image capture time information detected by the clock unit and the imaging direction detected by the imaging direction detecting unit during the time period from when a panoramic image capture is started to when the panoramic image capture is ended.

According to another embodiment of the present invention, a method for capturing an image is provided. The method includes the steps of converting an image input through a lens system into image data, generating a panoramic image from a plurality of the image data items of images captured during a time period from when a panoramic image capture is started to when the panoramic image capture is ended, detecting image capture time information regarding image capture times of the panoramic image, detecting an imaging direction during the time period from when a panoramic image capture is started to when the panoramic image capture is ended, and recording, in association with the generated panoramic image, the image capture time information and the imaging direction during the time period from when a panoramic image capture is started to when the panoramic image capture is ended.

According to still another embodiment of the present invention, a playback control apparatus includes a recording unit configured to record, in association with a panoramic image generated by assembling a plurality of image data items converted from a plurality of images captured during a time period from when a panoramic image capture is started to when the panoramic image capture is ended and input through a lens system, one of an imaging direction of the panoramic image during the time period from when a panoramic image capture is started to when the panoramic image capture is ended and coordinate information of an object detected by extracting features of the panoramic image, and a scroll direction determining unit configured to determine a scroll direction in which the panoramic image is played back on the basis of one of the imaging direction and the coordinate information.

According to yet still another embodiment of the present invention, a playback control method is provided. The method includes the steps of recording, in association with a panoramic image generated by assembling a plurality of image data items converted from a plurality of images captured during a time period from when a panoramic image capture is started to when the panoramic image capture is ended and input through a lens system, one of an imaging direction of the panoramic image during the time period from when a panoramic image capture is started to when the panoramic image capture is ended and coordinate information of an object detected by extracting features of the panoramic image, and determining a scroll direction in which the panoramic image is played back on the basis of one of the imaging direction and the coordinate information.

According to the embodiments of the present invention, an assembled panoramic image having a time difference therein displayed in a screen can be recorded in association with an imaging direction during a time period from the start time to the end time of capturing images and image capture time information. Accordingly, a viewer can efficiently view a desired image in a short time.

BRIEF DESCRIPTION OF THE DRAWINGS

FIG. 3A is a diagram schematically illustrating an imaging direction when capturing of the image of an object is started;

FIG. 3B is a diagram schematically illustrating an imaging direction immediately before capturing of the image of the object is ended;

DESCRIPTION OF THE PREFERRED EMBODIMENTS

Figure 1:
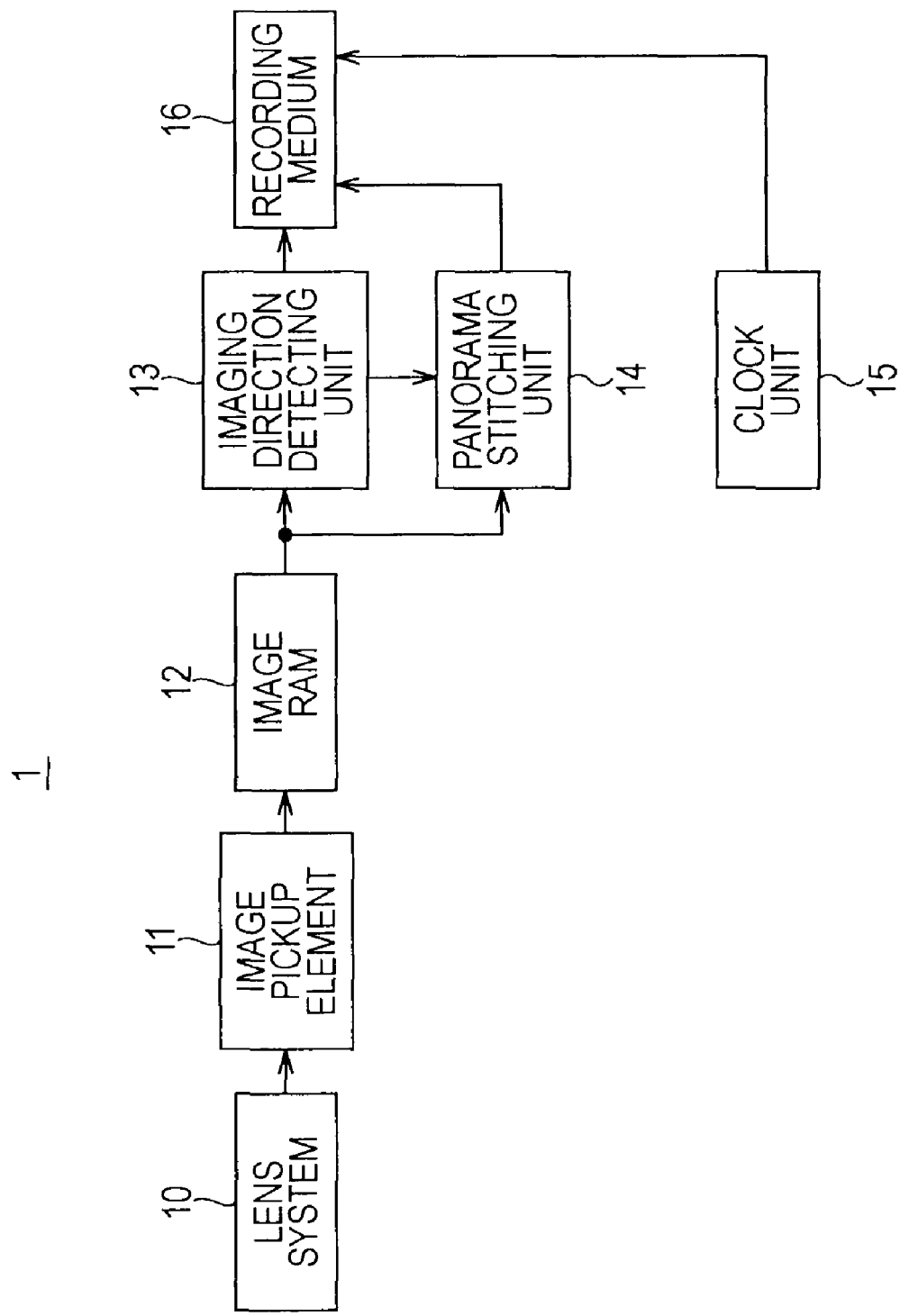
FIG. 1 is a block diagram illustrating an exemplary configuration of an image pickup apparatus according to an embodiment of the present invention.

Various exemplary embodiments of the present invention are described below with reference to the accompanying drawings. As shown in FIG. 1, an image pickup apparatus 1 includes a lens system 10, an image pickup element 11, an image random access memory (image RAM) 12, an imaging direction detecting unit 13, a panorama stitching unit 14, a clock unit 15, and a recording medium 16. The image pickup apparatus 1 further includes a drive source (not shown), such as a stepping motor. The drive source rotates an image pickup unit.

For example, a CCD or CMOS (complementary metal oxide semiconductor) sensor is used for the image pickup element 11. The image pickup element 11 receives an object image emitted thereonto via the lens system 10 and converts the object image into an electrical signal. In addition, the image pickup element 11 includes a certain signal processing circuit (not shown) that further converts the object image in the form of an electrical signal into digital image data. The image pickup element 11 then outputs the digital image data to the image RAM 12.

The image RAM 12 receives the image data output from the image pickup element 11. The image RAM 12 stores image data for a plurality of images. Thereafter, the image RAM 12 supplies the stored image data to the imaging direction detecting unit 13 and the panorama stitching unit 14.

The imaging direction detecting unit 13 receives the image data supplied from the image RAM 12. In order to perform a panorama generation process, the imaging direction detecting unit 13 detects the imaging directions of the plurality of continuous image data items and the amount of movement of every two image data items, that is, the motion vector between two image data items. Thereafter, the imaging direction detecting unit 13 supplies the detected motion vector to the panorama stitching unit 14. For example, by comparing image data items of two neighboring time-series fields, the imaging direction detecting unit 13 detects the motion vector.

When detecting the amount of movement between every two image data items, the imaging direction detecting unit 13 averages the amounts of movement in order to detect the imaging directions during a time period from the start time to the end time of capturing images as one direction. At that time, the imaging direction detecting unit 13 may average the amounts of movement after the imaging direction detecting unit 13 excludes the amounts of movement greater than or equal to a predetermined value. In addition, the imaging direction detecting unit 13 accumulates the amount of movement between two neighboring image data items for all image data items. At that time, the imaging direction detecting unit 13 may exclude the amounts of movement greater than or equal to a predetermined threshold value.

The imaging direction detecting unit 13 detects an imaging direction during a time period from the start time to the end time of capturing images on the basis of the detected motion vector. Thereafter, the imaging direction detecting unit 13 encodes the detected imaging direction into codes in several directions. That is, the imaging direction detecting unit 13 separates the imaging direction into several directions. For example, the imaging direction detecting unit 13 encodes the detected imaging direction into four values for the upward, downward, left, and right directions. By encoding the detected imaging direction in this manner, the amount of data supplied to the recording medium 16 can be reduced.

Subsequently, the imaging direction detecting unit 13 supplies, to the recording medium 16, the single encoded imaging direction during a time period from the start time to the end time of capturing images in association with the panoramic image generated by the panorama stitching unit 14.

As described above, the imaging direction detecting unit 13 can be used for generating an assembled panoramic image and detecting the imaging direction. Therefore, for the image pickup apparatus 1, a unit for generating an assembled panoramic image and recording the imaging direction and the imaging time information associated with the panoramic image can be produced at low cost.

The panorama stitching unit 14 receives the image data from the image RAM 12. In addition, the panorama stitching unit 14 receives, from the imaging direction detecting unit 13, the motion vector between the image data items used for an assembled panorama generation process. The panorama stitching unit 14 generates a panoramic image using the motion vector supplied from the imaging direction detecting unit 13 and the plurality of image data items supplied from the image RAM 12.

For example, the panorama stitching unit 14 stitches two images so that the same partial images in readout ranges, which have the same predetermined width, of images obtained in an imaging plane of the image pickup element overlap. Thus, an assembled image is generated (refer to, for example, Japanese Unexamined Patent Application Publication No. 2005-333396). The panorama stitching unit 14 supplies the assembled image to the recording medium 16.

Figure 2B:
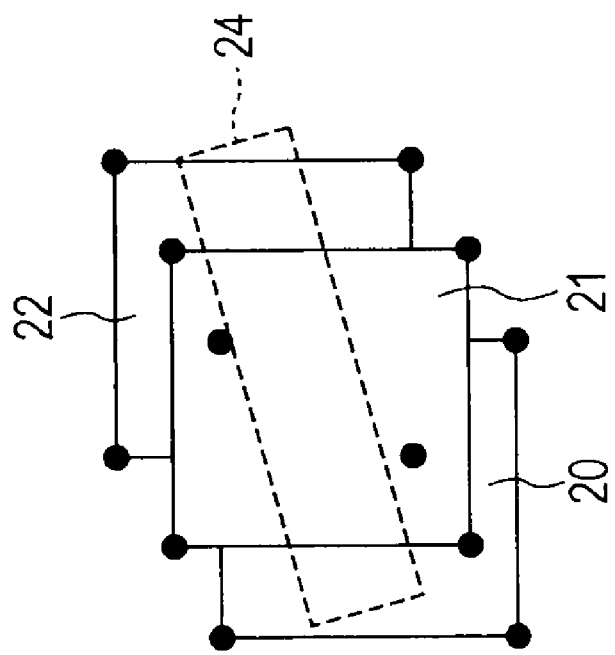
FIG. 2 is a diagram schematically illustrating an example of a trimming process.

In addition, the panorama stitching unit 14 performs a trimming process on the panoramic image generated from the image data items of the plurality of images. The trimming process is a process for extracting a partial image area of the image data, for example, a central area of the image. For example, by performing a trimming process on image data 20, image data 21, and image data 22 shown in FIGS. 2A and 2B, the panorama stitching unit 14 extracts necessary portions of the image data so as to generate an excellent panoramic image.

Figure 2A:
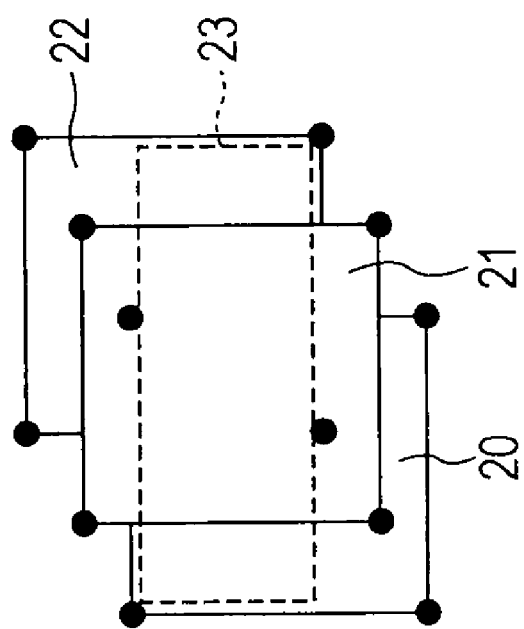

For example, as indicated by an area 23 shown in FIG. 2A, the panorama stitching unit 14 performs a trimming process so as to extract a rectangular panoramic image. If continuous image data items include a tilted image, that is, if a user captured the images while tilting the image pickup apparatus 1 from the horizontal plane, the panorama stitching unit 14 may perform a trimming process in a diagonal direction, as indicated by an area 24 shown in FIG. 2B.

The clock unit 15 serves as a time measuring unit that detects various image capture time information during a time period from the start time to the end time of capturing images. For example, the clock unit 15 detects an image capture start time at which image capture is started and an image capture end time at which image capture is ended. Thereafter, the clock unit 15 associates the detected image capture start time and image capture end time with the panoramic image generated by the panorama stitching unit 14 and supplies the image capture start time and image capture end time to the recording medium 16. However, for the image capture time information, the clock unit 15 may detect a capture time for each of the captured images or a time span between certain image capture times.

The recording medium 16 can record a digital signal. Examples of the recording medium 16 include a hard disk, a magneto-optical disk, a DVD, a mini disc (MD) (trade name), a semiconductor memory, and a magnetic tape. The recording medium 16 receives a panoramic image generated by the panorama stitching unit 14, the imaging direction detected by the imaging direction detecting unit 13 during a time period from the start time to the end time of capturing images, and the image capture start time and image capture end time detected by the clock unit 15. Subsequently, the recording medium 16 records the single imaging direction during a time period from the start time to the end time of capturing images and the image capture start time and image capture end time in association with the panoramic image. That is, the recording medium 16 records a single imaging direction for the assembled panoramic image.

In this way, the recording medium 16 records, in addition to the image capture start time and image capture end time, a single imaging direction during a time period from the start time to the end time of capturing images in association with a panoramic image. Therefore, an accurate time at which the panoramic image is captured can be obtained. That is, by recording the imaging direction of the panoramic image in addition to the image capture start time and image capture end time onto the recording medium 16, the image pickup apparatus 1 can obtain more accurate time at which the panoramic image is captured. Accordingly, as shown in FIG. 3B, when a viewer performs a scroll playback of a panoramic image 26 having a time difference in a screen on, for example, a TV monitor, the viewer can efficiently look at a desired image in a short time.

That is, the image pickup apparatus 1 allows the viewer to efficiently look at a desired image in a short time by appropriately changing the direction and the start point of scroll playback in accordance with the image capture start time and end time and the imaging direction of the panoramic image. For example, suppose that, when starting capturing of an image, the user wants to capture a panoramic image 25 shown in FIG. 3A. However, as shown in FIG. 3B, the image of an object 27 appearing immediately before an end time of image capture is unintentionally captured. In such a case, the image pickup apparatus 1 can prevent the panoramic image 26 from being played back by scrolling from the unwanted object 27 by appropriately changing the scroll playback direction and the start point. That is, when playing back the panoramic image 26, the image pickup apparatus 1 can easily scroll the panoramic image 26 along an imaging direction indicated by an arrow shown in FIG. 3B.

In addition, in the recording medium 16, the start time of image capture, the end time of image capture, and the imaging direction of a panoramic image are recorded in a user area defined by the EXIF (Exchangeable Image File Format) standard. The EXIF standard allows another user area for additional information to be provided in addition to the user area for shooting conditions. Thus, the user can record user- or device-defined information. Note that the image pickup apparatus 1 may define a new item and record information regarding the start time of image capture, the end time of image capture, and the imaging direction of a panoramic image in an area other than the user area, that is, in an undefined area.

In addition, for example, the recording medium 16 may store a recording time in addition to the image capture start time detected by the clock unit 15, without recording the image capture end time. Furthermore, the recording medium 16 may store the average of the capture times of individual images or the average time between the capture times in addition to the number of captured images (image data items) used for generating a panoramic image in the panorama stitching unit 14. Still furthermore, the recording medium 16 may store the image capture times of all of the image data items used for generating a panoramic image in the panorama stitching unit 14. The recording medium 16 may further store an image data captured when the image pickup apparatus 1 is stationary. Furthermore, the features of the object included in the image data may be extracted, and the coordinate information about the object may be detected. Thereafter, the coordinate information may be recorded in the recording medium 16 in association with the panoramic image. For example, in addition to information regarding the image capture start time, the image capture end time, and the imaging direction, the coordinates of a face based on a face image of the object detected by a face detecting unit (not shown) may be stored in the recording medium 16 in association with the panoramic image.

Figure 4:
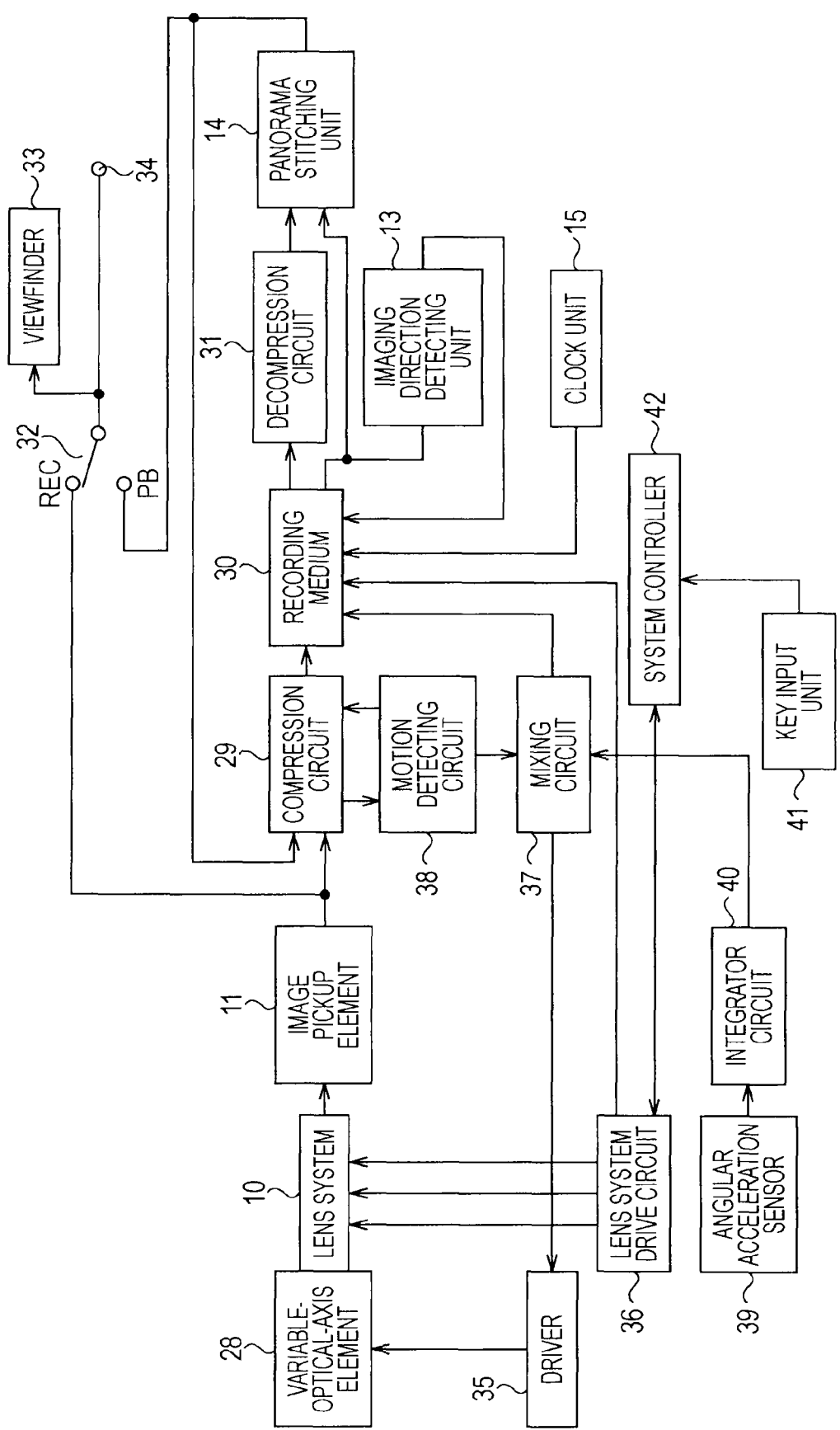
FIG. 4 is a block diagram illustrating an exemplary configuration of an image pickup apparatus according to an embodiment of the present invention.

Another embodiment of the image pickup apparatus 1 is described next with reference to FIG. 4. Note that the same numbering will be used in describing FIG. 4 as was utilized above in describing FIG. 1.

For example, a variable-optical-axis element 28 is of a shift lens type or a mirror block type. The variable-optical-axis element 28 is controlled by a driver 35. The lens system 10 controls optical systems, such as an iris, focusing, and zooming. In the lens system 10, control of these optical systems is performed by a lens system drive circuit 36. For example, when a panoramic image is captured, the optical axis is varied so that the movement of the image pickup apparatus 1 is canceled out at least while an electronic shutter of the image pickup element 11 is open. In addition, while the electronic shutter is closed, control is performed so that the optical axis returns to substantially the center of the movement of the image pickup apparatus 1. Such control is automatically performed under the control of a system controller 42 described below. Note that control of the optical systems can be automatically performed. In the image pickup apparatus 1, on the basis of such control, control information is output from the lens system drive circuit 36 and is supplied to the system controller 42 and a recording medium 30. Examples of the control information include an iris value, a focusing value, and a zooming value, and these values are output from the lens system drive circuit 36.

An image of an object is emitted onto the image pickup element 11 via the variable-optical-axis element 28 and the lens system 10. For example, a CCD or a CMOS sensor is used for the image pickup element 11. The image pickup element 11 converts the emitted object image into an electrical signal. The image pickup element 11 includes a predetermined signal processing circuit (not shown), which further converts the converted electrical signal into digital image data. The digital image data is output to a REC terminal of a switch 32 and a compression circuit 29.

The compression circuit 29 receives the output of the image pickup element 11. A motion detecting circuit 38 is connected to the compression circuit 29. In addition, the compression circuit 29 receives combined image information from the panorama stitching unit 14. The compression circuit 29 compresses the digital image data output from the image pickup element 11 and the combined image information output from the panorama stitching unit 14 so as to generate compressed image data. The compression circuit 29 then supplies the generated compressed image data to the recording medium 30.

The motion detecting circuit 38 computes a motion vector by comparing image data items in two temporally neighboring fields. The motion detecting circuit 38 then detects the motion of the image data item on the basis of the computed motion vector. The output of the motion detecting circuit 38 is supplied to the compression circuit 29 and a mixing circuit 37. In the image pickup apparatus 1, the motion detecting circuit 38 can be used to generate a panoramic image and detect the imaging direction. Therefore, a circuit for detecting the imaging direction, that is, the imaging direction detecting unit 13, can be efficiently produced on a lesser scale.

The mixing circuit 37 mixes motion information supplied from an integrator circuit 40 (described in more detail below) and the output of the motion detecting circuit 38 and supplies the mixing result to the driver 35 and the recording medium 30.

The recording medium 30 can record a digital signal. Examples of the recording medium 30 include a hard disk, a magneto-optical disk, a DVD, an MD (trade name), a semiconductor memory, and a magnetic tape. The recording medium 30 receives the compressed image data from the compression circuit 29, the control information from the lens system drive circuit 36, and the mixing result from the mixing circuit 37. In addition, the recording medium 30 receives the imaging direction information from the imaging direction detecting unit 13 and time information from the clock unit 15.

The recording medium 30 records the control information and the mixing result supplied for each of the compressed image data item in the form of sub-code data. The compressed image data item and the sub-code data are read from the recording medium 30 and are supplied to a decompression circuit 31. The recording medium 30 may have a structure including the image RAM 12 shown in FIG. 1 and the recording medium 16.

The decompression circuit 31 receives the compressed image data item and the sub-code data read from the recording medium 30. The decompression circuit 31 decompresses or decodes the image data compressed or encoded when the image data is recorded on the recording medium 30. The decompression circuit 31 supplies the decompressed image data to the panorama stitching unit 14. The decompressed image data serves as playback image data.

The panorama stitching unit 14 receives the playback image data from the decompression circuit 31, lens control information for the lens system drive circuit 36 from the recording medium 30, and the sub-code data (the mixing result) from the mixing circuit 37. The panorama stitching unit 14 then generates a panoramic image and supplies the generated panoramic image to a PB terminal of the switch 32 and the compression circuit 29.

The imaging direction detecting unit 13 receives information about the result of mixing a plurality of detected motions from the recording medium 30. The imaging direction detecting unit 13 detects the imaging direction during a time period from the start time to the end time of capturing images for the panoramic image on the basis of the supplied information about the result of mixing a plurality of detected motions. The imaging direction detecting unit 13 then supplies, to the recording medium 30, the information regarding the imaging direction during a time period from the start time to the end time of capturing images in association with the information regarding the image assembled by the panorama stitching unit 14.

The clock unit 15 detects image capture time information, which includes an image capture start time and an image capture end time. The clock unit 15 then supplies the detected time information to the recording medium 30 in association with the panoramic image assembled by the panorama stitching unit 14.

The switch 32 selects a terminal REC when image is captured. Thus, an image being captured by the image pickup element 11 is displayed in a viewfinder 33. In addition, the switch 32 allows the image being captured by the image pickup element 11 to be delivered to a video output terminal 34 so that the image is displayed on, for example, an external video monitor. When a panoramic image is generated or the panoramic image is played back, the switch 32 selects the PB terminal. Thus, playback image data is delivered to the video output terminal 34. At the same time, the playback image data is delivered to the viewfinder 33. By selecting the PB terminal when a panoramic image is generated or the panoramic image is played back, the switch 32 causes the viewfinder 33 to display the playback image supplied from the recording medium 30. Note that, when a panoramic image is displayed, the processing of the panorama stitching unit 14 is stopped.

An angular acceleration sensor 39 is formed from, for example, a gyro sensor. The angular acceleration sensor 39 detects variation in the imaging direction. For example, a sensor used for image stabilization and mounted in the image pickup apparatus 1 can be used as the angular acceleration sensor 39. By using the output from the angular acceleration sensor 39, the user can recognize a relative position of a captured image even when the user is unable to obtain a correct motion vector in the motion detecting circuit 38.

The integrator circuit 40 integrates the output from the angular acceleration sensor 39 so as to obtain motion information. By averaging the detection results of angular acceleration received from the angular acceleration sensor 39, the integrator circuit 40 can generate information about the average motion. That is, the integrator circuit 40 neglects a small motion and generates the motion information. The integrator circuit 40 then outputs the generated motion information to the mixing circuit 37.

A key input unit 41 includes switches used to configure a variety of settings of the image pickup apparatus 1 and a switch used to switch between on and off of a panorama shooting mode. The setting information configured through these setting keys is input from the key input unit 41 to the system controller 42. Thereafter, the setting information is stored in, for example, a RAM. For example, when preparing to take panorama shots, a photographer turns on the panorama shooting mode on/off setting switch provided in the key input unit 41. Subsequently, by moving the lens system 10 while following an object and taking shots, the photographer can record a panoramic image and information regarding the image capture start and end times and an imaging direction during a time period from the image capture start time to the image capture end time.

The system controller 42 includes a central processing unit (CPU), a RAM, and a read only memory (ROM). The system controller 42 controls the operation of the image pickup apparatus 1. For example, the system controller 42 controls the operation of the image pickup apparatus 1 on the basis of the setting information configured through the variety of setting keys of the key input unit 41. The system controller 42 further includes a timer (not shown) used for setting a predetermined time period. In addition, the system controller 42 may perform control so that an instruction to maintain the moving direction of the image constant is displayed in a liquid crystal screen of the viewfinder 33. Alternatively, by providing a sound device, this instruction may be provided with voice guidance.

Figure 5:
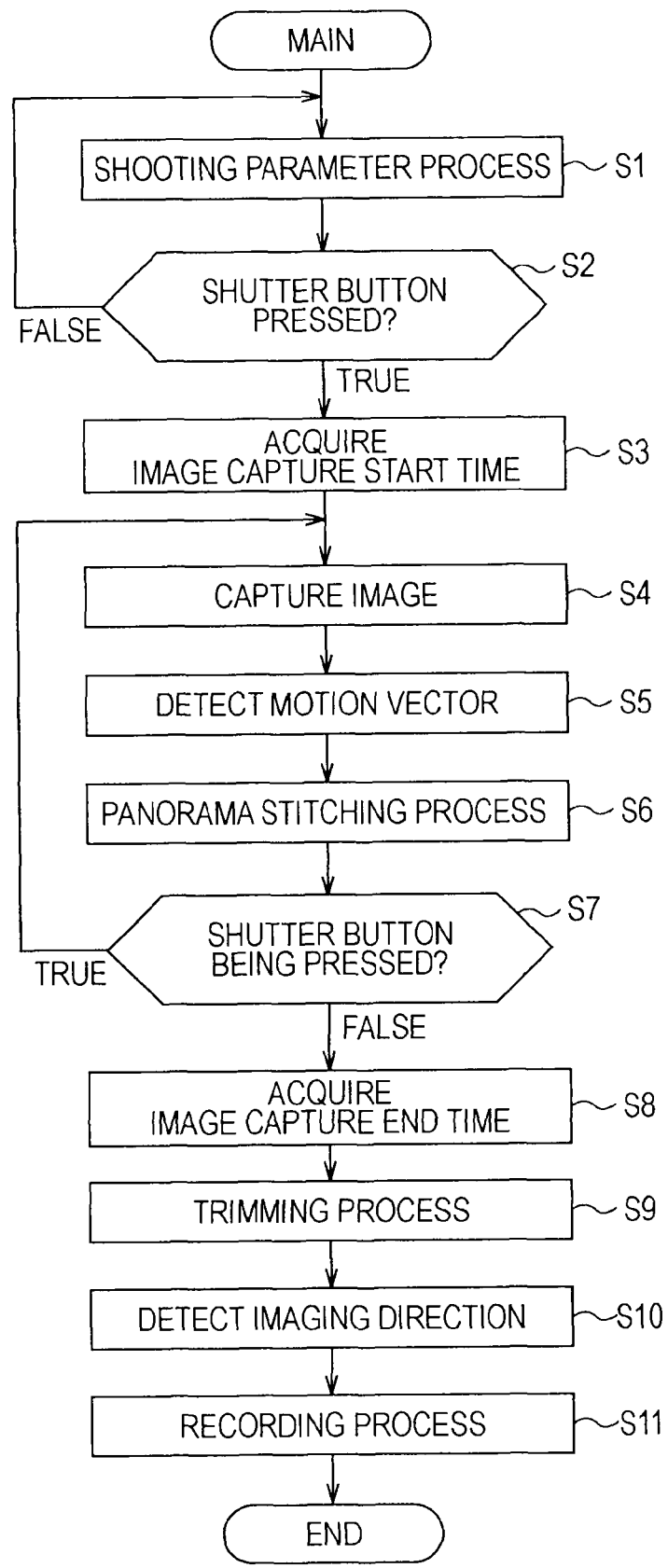
FIG. 5 is a flowchart illustrating a processing procedure of generating a panoramic image.

An exemplary processing procedure for generating a panoramic image using the configuration shown in FIG. 1 is described next with reference to the flowchart shown in FIG. 5. Note that the system controller 42 shown in FIG. 4 controls the components of FIG. 1.

First, the image pickup apparatus 1 diagnoses and initializes the hardware. In step S1, the image pickup apparatus 1 performs various image capture parameter processing. For example, the image pickup apparatus 1 acquires information about luminance detected by an exposure meter (not shown) and computes image capture parameters, such as an aperture value and a shutter speed.

In step S2, the system controller 42 determines whether the shutter button has been pressed. That is, the system controller 42 determines an image capture start time on the basis of whether an operation signal based on the pressing operation of the shutter button has been generated. More specifically, if the system controller 42 can recognize generation of the operation signal (TRUE), the processing proceeds to step S3. However, if the system controller 42 is unable to recognize generation of the operation signal (FALSE), the processing returns to step S1.

In step S3, the recording medium 16 acquires the image capture start time from the clock unit 15.

In step S4, the image pickup apparatus 1 captures a plurality of images. For example, the system controller 42 controls an aperture system drive unit of the lens system 10 using the parameter obtained in step S1 and captures an image using the image pickup element 11. The image pickup element 11 converts the captured object image into an electrical signal, for example, an imaging signal C1. The imaging signal C1 is supplied to the image RAM 12.

In step S5, the imaging direction detecting unit 13 detects a motion vector. More specifically, the imaging direction detecting unit 13 computes a relative displacement between the imaging signal C1 stored in the image RAM 12 and an assembled image generated from imaging signals extracted in the previous image captures. In this way, the imaging direction detecting unit 13 detects the moving direction between the captured images and the amount of movement between the captured images, that is, the motion vector.

In step S6, the panorama stitching unit 14 performs a panorama stitching process. More specifically, the panorama stitching unit 14 sequentially assembles the imaging signal C1 stored in the image RAM 12 in step S4 on the basis of the motion vector detected in step S5 so as to generate a panoramic image.

In step S7, the system controller 42 determines whether the shutter button is currently being pressed. More specifically, the system controller 42 detects the image capture end time on the basis of the operation signal received from the key input unit 41. If the system controller 42 determines that the pressing operation continues (TRUE), the processing returns to step S4 in order to continue the image capture operation. Thereafter, the object image capturing operation is repeated. However, if the system controller 42 determines that the pressing operation is completed (FALSE), the processing proceeds to step S8 in order to perform the image capturing completion operation.

In step S8, the recording medium 16 acquires the image capture end time from the clock unit 15.

In step S9, the panorama stitching unit 14 performs a trimming process on the panoramic image generated in step S6.

In step S10, the imaging direction detecting unit 13 detects the imaging direction during a time period from the start time to the end time of capturing images on the basis of the plurality of motion vectors acquired in step S5. That is, the imaging direction detecting unit 13 detects a single imaging direction during a time period from the start time to the end time of capturing images on the basis of the plurality of motion vectors.

In step S11, the recording medium 16 associates the panoramic image obtained in step S9 with the information regarding the imaging direction during a time period from the start time to the end time of capturing images obtained in step S10, the image capture start time obtained in step S3, and the image capture end time obtained in step S8. The recording medium 16 then stores these information items.

In this way, according to the present embodiment, the image pickup apparatus 1 can record a panoramic assembled image including images captured at different time points between the start time to the end time of capturing the images with the imaging direction during a time period from the start time to the end time of capturing images and the time points. Consequently, according to the present embodiment, when a viewer performs scroll playback of a plurality of panoramic images, the image pickup apparatus 1 allows the viewer to efficiently look at desired panoramic images in a short time.

In addition, according to the present embodiment, if an image of an object (e.g., a human) that the photographer does not want to capture at the image capture start time is captured immediately before the image capture operation is completed, the image pickup apparatus 1 can prevent the panoramic image from being played back by scrolling from the image including the unwanted object. That is, for example, when the viewer performs scroll playback of a panoramic image stored in the recording medium 16 using a TV monitor, the image pickup apparatus 1 allows the viewer to efficiently look at desired panoramic images in a short time.

Furthermore, according to the image pickup apparatus 1 of the present embodiment, when a user wants to efficiently delete image data including the image of an object (e.g., a human) unintentionally captured, the user can efficiently delete the unwanted image data by starting the scroll playback in a direction opposite to the imaging direction.

While the exemplary processing for generating a panoramic image while capturing images, that is, in real time, has been described with reference to the flowchart shown in FIG. 5, the application is not limited to this exemplary processing. For example, the panorama stitching unit 14 may generate a panoramic image after all of the image data items obtained during a time period from the start time to the end time of capturing the images are stored in the recording medium 16.

Figure 6:
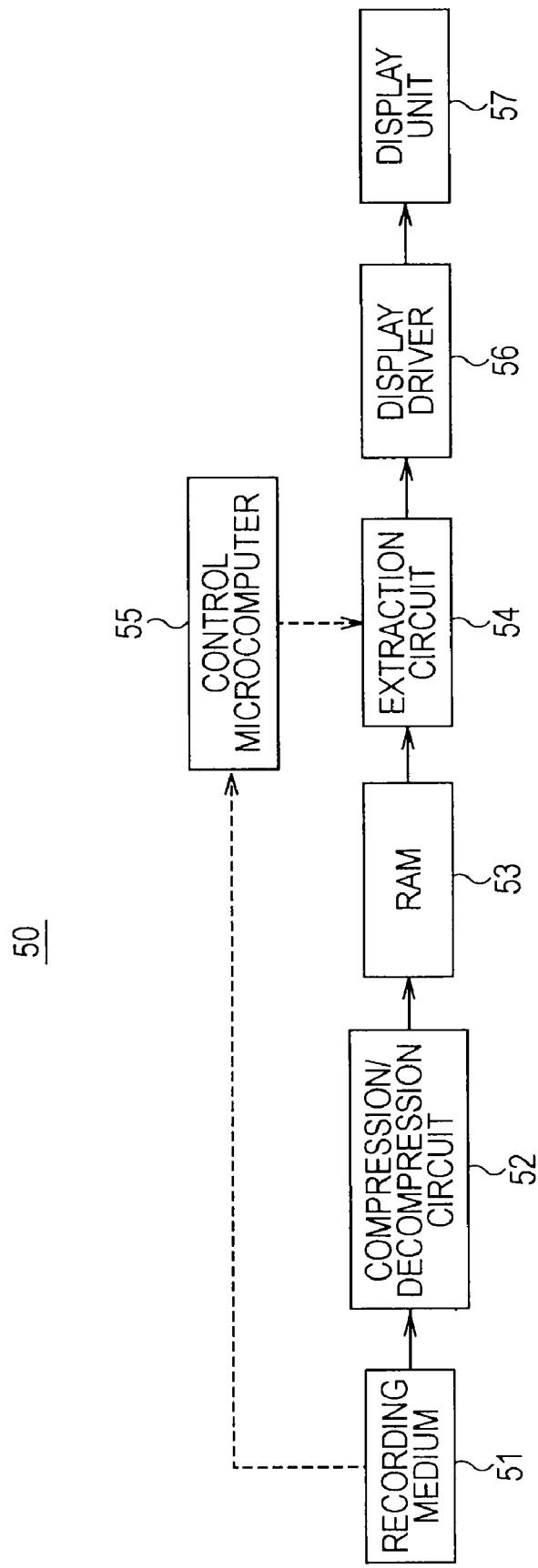
FIG. 6 is a block diagram illustrating an exemplary configuration of a playback control apparatus according to an embodiment of the present invention.

An exemplary playback control apparatus for performing scroll playback of a panoramic image according to the present embodiment is described next. As shown in FIG. 6, a playback control apparatus 50 includes a recording medium 51, a compression/decompression circuit 52, a RAM 53, an extraction circuit 54, a control microcomputer 55, a display driver 56, and a display unit 57.

Examples of the recording medium 51 include a hard disk, a magneto-optical disk, a DVD, an MD (trade name), a semiconductor memory, and a magnetic tape. The recording medium 51 records a panoramic image compressed using, for example, a JPEG format in association with image capture information regarding panoramic shooting.

Examples of the image capture information regarding panoramic shooting include the imaging direction during a time period from the start time to the end time of capturing images, the coordinate information of an object obtained by feature extraction, and panoramic-image capture time information. For example, as information indicating the imaging direction during a time period from the start time to the end time of capturing images, four values indicating the upward, downward, left, and right direction are recorded in the recording medium 51. As the coordinate information of an object obtained by feature extraction, the coordinates of a face of the object image obtained through face detection, more specifically, the positions of the eyes, the position of the nose, the position of the mouth, or the positions of a plurality of parts, such as the eyes and the nose, are stored in the recording medium 51. Note that the object is not limited to a human if the object has information indicating a face, such as the eyes, nose, and mouth. For example, the object may be a dog or a cat. As the panoramic-image capture time information, the start time and the end time of capturing the panoramic image are recorded in the recording medium 51, for example. Such image capture information is recorded in a user area of the recording medium 51 defined by the EXIF standard. The recording medium 51 supplies the panoramic image to the compression/decompression circuit 52 and supplies the image capture information associated with the panoramic image to the control microcomputer 55.

The compression/decompression circuit 52 receives, from the recording medium 51, the panoramic assembled image compressed using, for example, a JPEG format. The compression/decompression circuit 52 then performs a compression/decompression process on the panoramic assembled image supplied from the recording medium 51. Thereafter, the compression/decompression circuit 52 supplies the decompressed panoramic image data to the RAM 53.

The RAM 53 receives, from the compression/decompression circuit 52, the panoramic image data decompressed by the compression/decompression circuit 52. Under the control of the control microcomputer 55, the RAM 53 supplies part of the panoramic image data supplied from the compression/decompression circuit 52 to the extraction circuit 54.

In order to display the panoramic image on the display unit 57, the extraction circuit 54 enlarges or reduces the panoramic image data supplied from the RAM 53 so that the panoramic image has a desired size. The extraction circuit 54 then supplies the generated image data to the display driver 56.

The control microcomputer 55 is connected to the recording medium 51, the compression/decompression circuit 52, the RAM 53, the extraction circuit 54, the display driver 56, and the display unit 57. The control microcomputer 55 controls the operations of these units. The control microcomputer 55 receives the image capture information associated with the panoramic image data recorded in the recording medium 51. Subsequently, the control microcomputer 55 supplies the extraction area of the panoramic image data and information regarding the enlargement factor or the reduction factor to the extraction circuit 54.

For example, as the information regarding the extraction area, the control microcomputer 55 supplies, to the extraction circuit 54, instruction values used for scroll displaying the extraction image on the display unit 57 by sequentially shifting the coordinates of the extraction image in the horizontal or vertical direction. In this way, as described in more detail below, the control microcomputer 55 determines a scroll direction used when the panoramic image is played back on the basis of the associated imaging direction during a time period from the start time to the end time of capturing images and the coordinate information of the object. In addition, the control microcomputer 55 determines a scroll start point used when the panoramic image is played back on the basis of the associated imaging direction during a time period from the start time to the end time of capturing images and the coordinate information of the object. Furthermore, the control microcomputer 55 determines the scroll speed used when the panoramic image is played back on the basis of the coordinate information of the object.

That is, the playback control apparatus 50 determines the scroll direction, the scroll start point, and the scroll speed used when the panoramic image is played back on the basis of the image capture information associated with the panoramic image. Accordingly, the playback control apparatus 50 allows the viewer to effectively enjoy looking at the panoramic image when the viewer continuously scroll-plays back a plurality of panoramic images.

When the coordinate information about the object is not recorded in the recording medium 51 in association with the panoramic image, the control microcomputer 55 detects the coordinate information. For example, the control microcomputer 55 detects the positions of the eyes in the face sub-image of the panoramic image as a reference position. Subsequently, the control microcomputer 55 normalizes the face sub-image on the basis of the positions of the eyes and extracts the luminance of each of parts of the face as the features of the face. Thereafter, the control microcomputer 55 performs a variety of determination processes using the luminance of each of the extracted parts of the face image and pre-recorded determination information. For example, the control microcomputer 55 determines whether the object is an adult or a child, whether the face is a laughing face or not, and whether the object is pre-registered or not. While the above example has been described with reference to the eyes serving as the reference position, a part of the face other than the eyes may be used for the reference position. For example, the position of the nose included in the face or the positions of a plurality of parts, such as the eyes and nose, may be used for the reference position.

The display driver 56 receives part of the panoramic image data to be displayed on the display unit 57 from the extraction circuit 54. The display driver 56 supplies the image data supplied from the extraction circuit 54 to the display unit 57.

The display unit 57 is formed from, for example, an LCD. The display unit 57 displays the image data supplied from the display driver 56.

Figure 7:
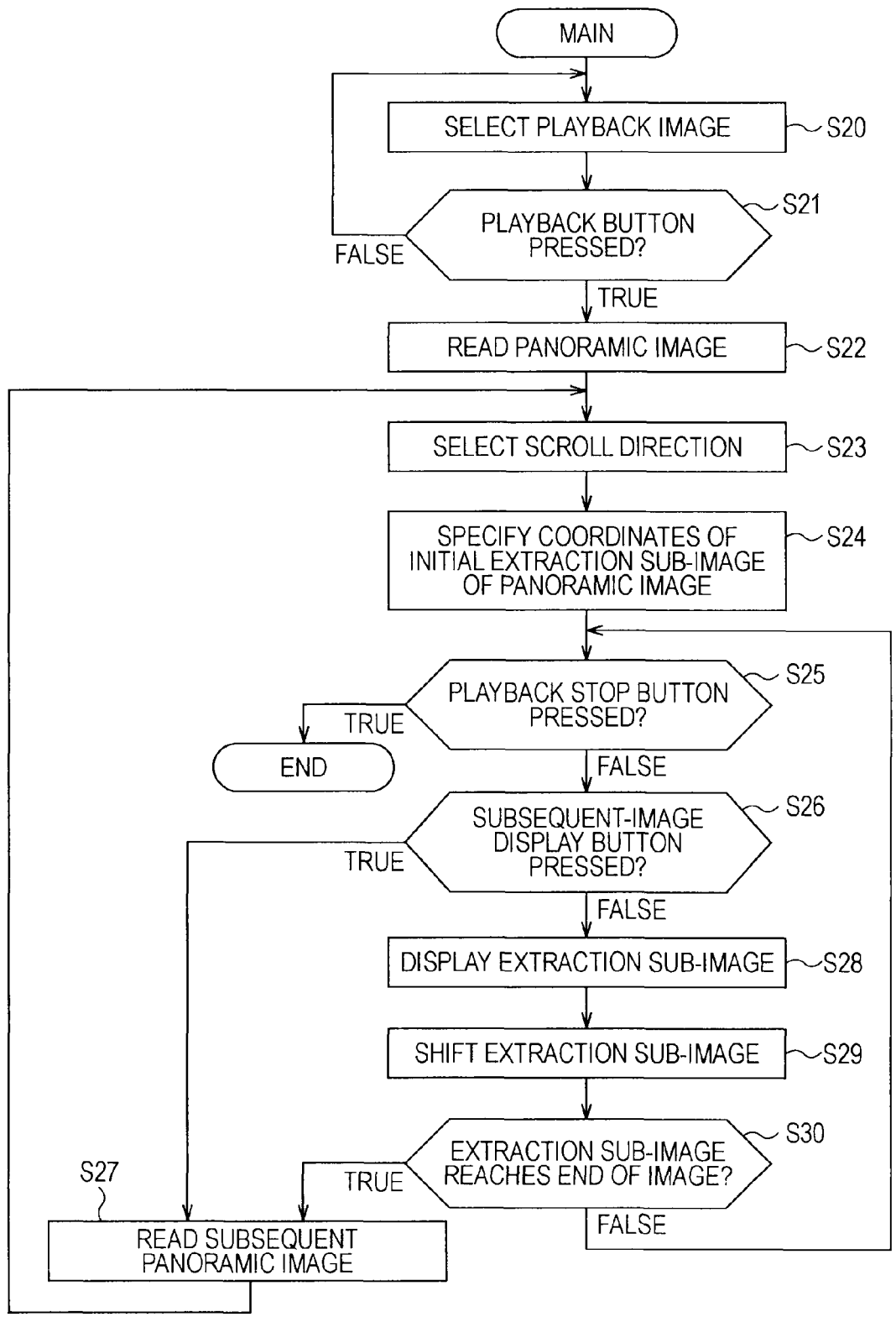
FIG. 7 is a flowchart illustrating an example of a method for scrolling a panoramic image.

An exemplary method for controlling playback performed by the playback control apparatus 50 shown in FIG. 6 is described next with reference to the flowchart shown in FIG. 7.

First, the playback control apparatus 50 diagnoses and initializes the hardware. In step S20, the control microcomputer 55 selects a panoramic image to be played back.

In step S21, the control microcomputer 55 determines whether a playback button (not shown) of the operation unit has been pressed. That is, the control microcomputer 55 recognizes a playback start timing on the basis of whether an operation signal based on a playback button pressing operation is generated. If the control microcomputer 55 can recognize generation of the operation signal ("TRUE" in step S21), the processing proceeds to step S22. However, if the control microcomputer 55 does not recognize generation of the operation signal ("FALSE" in step S21), the processing proceeds to step S20, where the process is performed again.

In step S22, the control microcomputer 55 reads the selected panoramic image. More specifically, using the compression/decompression circuit 52, the control microcomputer 55 decompresses the panoramic image selected, in step S20, from among decompressed panoramic images recorded in the recording medium 51. Thereafter, the control microcomputer 55 stores, in the RAM 53, the panoramic image decompressed by the compression/decompression circuit 52.

In step S23, the control microcomputer 55 selects a scroll direction used when the panoramic image is played back. More specifically, the control microcomputer 55 determines the scroll direction on the basis of the information regarding the imaging direction associated with the panoramic image read from the RAM 53 in step S22 and the coordinate information of the object.

As an example of a method for determining the scroll direction, a method for playing back the panoramic image in the length direction of the panoramic image is described with reference to FIGS. 8 to 10.

When the imaging direction during a time period from the start time to the end time of capturing a panoramic image is associated with the panoramic image, it is determined that the scroll direction is the same as the imaging direction. For example, in a panoramic image 60 shown in FIG. 8, as shown by an arrow indicating an imaging direction 61, information indicating that the image capture started from the left and ended on the right is associated with the panoramic image 60. Accordingly, the control microcomputer 55 determines that a playback direction 62 is the same as the imaging direction 61. That is, the control microcomputer 55 determines that a scroll direction is the same as the imaging direction 61.

Alternatively, when the coordinates of the face serving as the coordinate information of the object are associated with the panoramic image or the coordinates of the face are detected in advance, it is determined that the scroll direction is a direction from one end of the panoramic image in the left-right directions to which the coordinates of the face are closer to the other end. That is, the control microcomputer 55 plays back the panoramic image by scrolling from one end of the panoramic image in the length direction to which the coordinates of the face of the object are closer to the other end. For example, for the panoramic image 60 shown in FIG. 9, the control microcomputer 55 determines that a playback direction 65 is a direction from the right end that is closer to the position of the coordinates 64 of the center of the face to the left end.

Alternatively, when the coordinates of the face and the imaging direction during a time period from the start time to the end time of capturing a panoramic image are associated with the panoramic image, the scroll playback direction is determined on the basis of the coordinates of the face. The control microcomputer 55 determines the scroll playback direction using the coordinates of the face in preference to the information regarding the imaging direction. For example, for the panoramic image 60 shown in FIG. 10, since an imaging direction 67 and the coordinates 68 of the face are associated with the panoramic image 60, the control microcomputer 55 determines that a playback direction 69 is a direction from the right end that is closer to the position of the coordinates 68 of the face to the left end. That is, the control microcomputer 55 determines the scroll direction using the coordinates 68 of the face in preference to the imaging direction 67.

Still alternatively, when the coordinates of a plurality of the faces are associated with the panoramic image and if the weight information about the coordinates of the faces is recorded, the control microcomputer 55 determines the scroll direction on the basis of the coordinates of the face having the highest weight among the coordinates of the faces. For example, the control microcomputer 55 determines that a direction from one end of the panoramic image in the length direction closer to the center point of the face having the highest weight to the other end is the playback direction. For example, when assigning weights to the coordinates of the faces of an adult and a child, a higher weight can be given to the child. When assigning weights to the coordinates of a laughing face and a non-laughing face, a higher weight can be given to the laughing face. When assigning weights to the coordinates of a pre-registered face and a non-pre-registered face, a higher weight can be given to the pre-registered face. Alternatively, for example, the control microcomputer 55 may determine that a direction from one end of the panoramic image in the length direction closer to or further away from the center point of the coordinates of the plurality of faces to the other end is the playback direction.

Still alternatively, when the image capture time information about the panoramic image is associated with the panoramic image 60, the control microcomputer 55 may determine the scroll direction on the basis of the imaging direction and the image capture time information. For example, the control microcomputer 55 may determine that a direction from the image having an early image capture time to the image having a late image capture time is the scroll direction.

Figure 8:
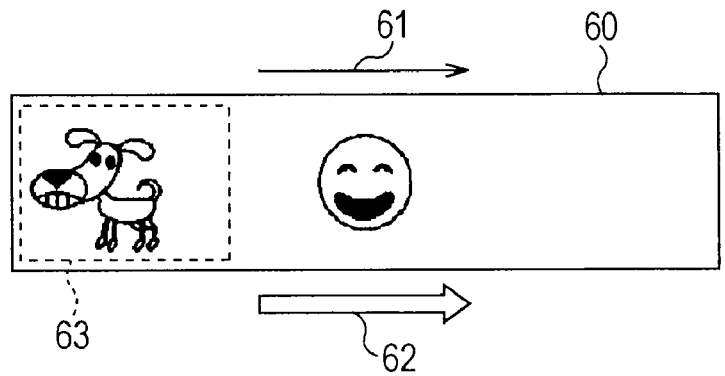
FIG. 8 is a schematic illustration of an example of the method for scrolling a panoramic image.
Figure 9:
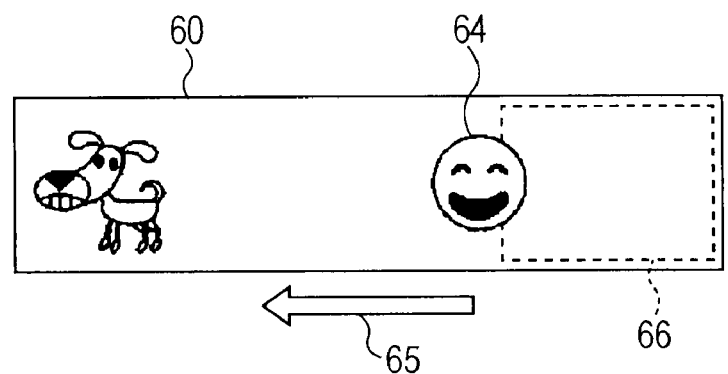
FIG. 9 is a schematic illustration of an example of the method for scrolling a panoramic image.
Figure 10:
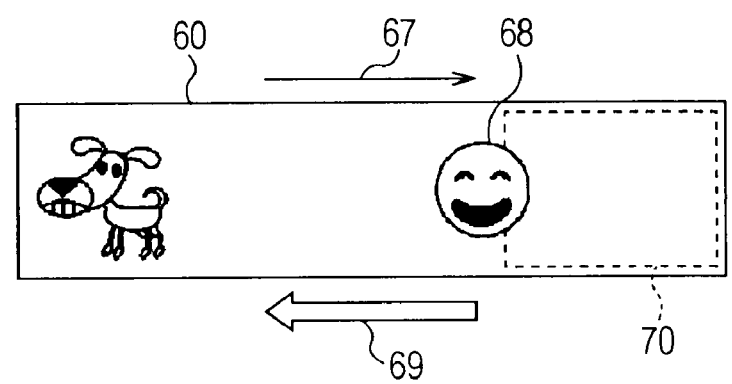
FIG. 10 is a schematic illustration of an example of the method for scrolling a panoramic image.

In addition, in accordance with the setting, the control microcomputer 55 may determine that one of a direction opposite to the imaging direction 61 shown in FIG. 8, the playback direction 65 shown in FIG. 9, and the playback direction 69 shown in FIG. 10 is the playback direction, for example. Furthermore, the control microcomputer 55 may determine that a direction from the image having a late image capture time to the image having an early image capture time is the scroll direction.

Figure 11:
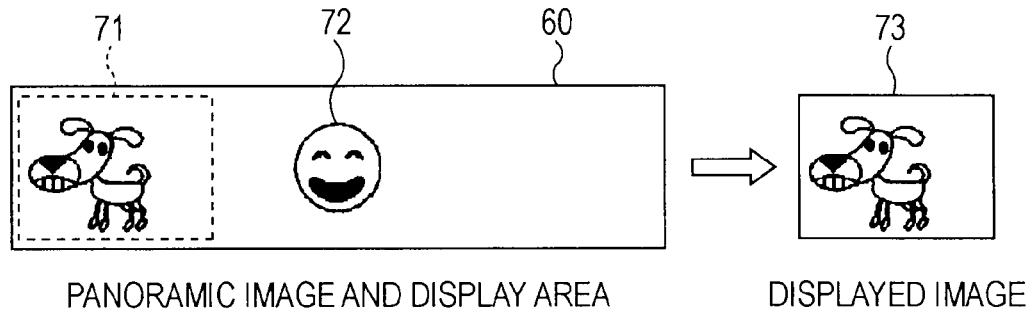
FIG. 11 is a schematic illustration of an example of the method for scrolling a panoramic image.

In step S24, the control microcomputer 55 computes an initial display area in order to extract an area displayed at the initial time of playback from the entire panoramic image. For example, as shown in FIG. 11, the control microcomputer 55 determines the scroll start point, that is, a display area 71, on the basis of the coordinates 72 of the face associated with the panoramic image 60 read in step S22 or the coordinates of the face detected when panorama shooting is performed. The image in the display area 71 is displayed in the display unit 57 as a display image 73.

More specifically, since the imaging direction 61 indicating that the images are captured from the left to right is associated with the panoramic image 60 shown in FIG. 8, the control microcomputer 55 determines that the start point of the scroll playback is the leftmost image. That is, the control microcomputer 55 determines that a playback start image 63 is an initial display area of the scroll playback. However, the control microcomputer 55 may determine that, in accordance with the settings, the final area in the imaging direction 61 may be determined as the playback start image.

Alternatively, when the coordinates of the face are associated with the panoramic image or the coordinates of the face are detected in advance, the control microcomputer 55 may determine one end of the panoramic image in the length direction close to the coordinates of the face as the scroll start point. For example, for the panoramic image shown in FIG. 9, since the position of the coordinates 64 is close to the right end in the length direction, the control microcomputer 55 determines the right end as a playback start image 66. However, the control microcomputer 55 may determine that, in accordance with the settings, one of the right end and the left end which is further away from the position of the coordinates 64 is the playback start image 66.

Still alternatively, when the coordinates of the face and the information regarding the imaging direction are associated with the panoramic image, the control microcomputer 55 determines the scroll start point on the basis of the coordinates of the face. That is, the control microcomputer 55 determines the scroll start point using the coordinates of the face in preference to the information regarding the imaging direction. For example, for the panoramic image 60 shown in FIG. 10, since an imaging direction 67 and the coordinates 68 of the face are present, the control microcomputer 55 determines that the end of the panoramic image 60 in the length direction closer to the position of the coordinates 68 is a playback start image 70. However, the control microcomputer 55 may determine that, in accordance with the settings, the end further away from the position of the coordinates 68 is the playback start image.

Still alternatively, a plurality of the coordinates of the faces are associated with the panoramic image and if weight information about the coordinates are recorded, the control microcomputer 55 determines the scroll start point on the basis of the coordinates of the face having the highest weight among the plurality of the coordinates of the faces. For example, the control microcomputer 55 determines that the coordinates of the face having the highest weight, that is, the end of the panoramic image in the length direction close to the coordinates of the face having a higher priority is the scroll start point. For example, as described above, when assigning weights to the coordinates of the faces of an adult and a child, a higher weight is given to the child. When assigning weights to the coordinates of a laughing face and a non-laughing face, a higher weight is given to the laughing face. When assigning weights to the coordinates of a pre-registered face and a non-pre-registered face, a higher weight is given to the pre-registered face. However, for example, the control microcomputer 55 may determine that the end of the panoramic image in the length direction the furthest away from the center point of the face among the plurality of faces is the scroll start point.

In step S25, the control microcomputer 55 determines whether the playback top button has been pressed so as to recognize the panoramic image playback stop timing. That is, if the control microcomputer 55 is able to recognize the generation of the operation signal ("TRUE" in step S25), the control microcomputer 55 stops playback of the panoramic image. Thus, the processing is completed. However, if the control microcomputer 55 is unable to recognize the generation of the operation signal ("FALSE" in step S25), the processing proceeds to step S26.

In step S26, the control microcomputer 55 determines whether a button of the operation unit for instructing jumping to the processing of the next image has been pressed. Thus, the control microcomputer 55 recognizes a timing to jump to the processing of the next panoramic image. That is, if the control microcomputer 55 is able to recognize the generation of the operation signal ("TRUE" in step S26), the processing proceeds to step S27. The control microcomputer 55 stops playback of the panoramic image being currently displayed and starts reading the next image. However, if the control microcomputer 55 is unable to recognize the generation of the operation signal ("FALSE" in step S26), the processing proceeds to step S28. That is, the control microcomputer 55 starts displaying the currently selected panoramic image.

In step S27, the control microcomputer 55 reads a panoramic image subsequent to the currently selected panoramic image. The term "subsequent panoramic image" refers to a panoramic image having a file number larger than that of the currently selected panoramic image by one. If a panoramic image having a file number larger than that of the currently selected panoramic image by one is not present, the term "subsequent panoramic image" refers to a panoramic image having a file number larger than that of the currently selected panoramic image by two. If a panoramic image having a file number larger than that of the currently selected panoramic image by two is not present, the term "subsequent panoramic image" refers to a panoramic image having a file number larger than that of the currently selected panoramic image by three. For numbers larger than three or more, a similar definition is used. When such a selection operation is performed and if the file number reaches the selectable maximum file number, the panoramic image having a minimum file number is selected as a candidate of the subsequent image. As in step S22, in step S27, using the compression/decompression circuit 52, the control microcomputer 55 decompresses a panoramic image subsequent to the previously selected panoramic image among the compressed panoramic images stored in the recording medium 51. Thereafter, the control microcomputer 55 stores, in the RAM 53, the panoramic image decompressed by the compression/decompression circuit 52.

In step S28, the extraction image of the panoramic image is displayed. The control microcomputer 55 instructs the extraction circuit 54 to read part of the panoramic image in the extraction area from the RAM 53. Thereafter, the extraction circuit 54 enlarges or reduces the panoramic image so that the panoramic image has an optimum size for the display unit 57. When a high-definition image is played back, the term "optimum size for the display unit 57" refers to a standard format size, such as 1920 by 1080. The panoramic image converted into the standard format size by the extraction circuit 54 is D/A converted by the display driver 56. Thereafter, part of the panoramic image is displayed on the display unit 57. Note that when, in step S28, a first image is displayed, a panoramic extraction area computed in step S24 is used. However, when an image subsequent to the first image (a second image or later) is displayed, the area computed in step S29 is used.

In step S29, the extraction image is shifted. That is, by controlling the amount of shift of the extraction image and the shift timing, the control microcomputer 55 shifts the currently selected extraction image in one of the upward, downward, left, and right directions selected in step S23.

Figure 12:
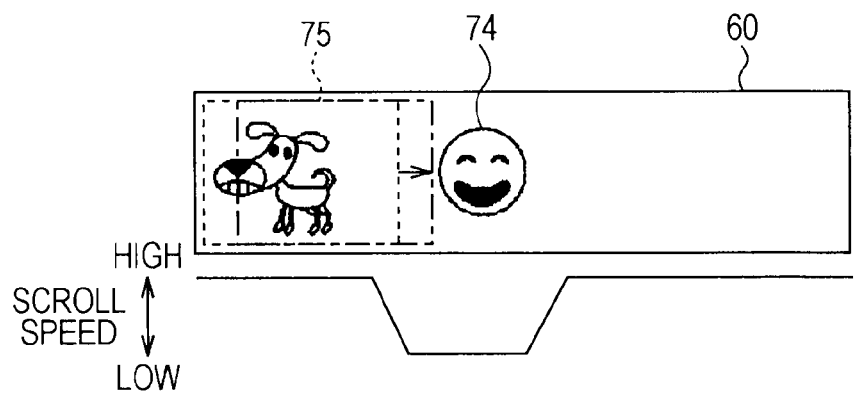
FIG. 12 is a schematic illustration of an example of a speed for scrolling a panoramic image.

When the coordinates of the face are included in the selected extraction image, the control microcomputer 55 reduces the amount of shift to a value less than that used in a normal case. For example, as shown in FIG. 12, when coordinates 74 of the face are included in the selected extraction image, the control microcomputer 55 may delay the timing of the shift while the coordinates 74 of the face are being included in a display area 75 in order to perform the scroll display slowly. In this way, by reducing the scroll speed while an image that the user wants to view is being displayed, the control microcomputer 55 can provide an efficient viewing method to a user.

In addition, in order to control the scroll speed, the control microcomputer 55 can employ a variety of methods. For example, while the face is being displayed on the display unit 57, the control microcomputer 55 may gradually reduce the scroll speed until the center of the screen is displayed. After the center of the screen is displayed, the control microcomputer 55 may gradually increase the scroll speed. Alternatively, while the face is being displayed on the display unit 57, the control microcomputer 55 may gradually reduce the scroll speed and enlarge the image of the face portion until the center of the screen is displayed. After the center of the screen is displayed, the control microcomputer 55 may gradually increase the scroll speed and gradually shrink the image of the face portion. Still alternatively, while the face is being displayed on the display unit 57, the control microcomputer 55 may gradually increase the scroll speed and enlarge the image of the face portion until the center of the screen is displayed. After the center of the screen is displayed, the control microcomputer 55 may gradually reduce the scroll speed and gradually shrink the image of the face portion.

Figure 13:
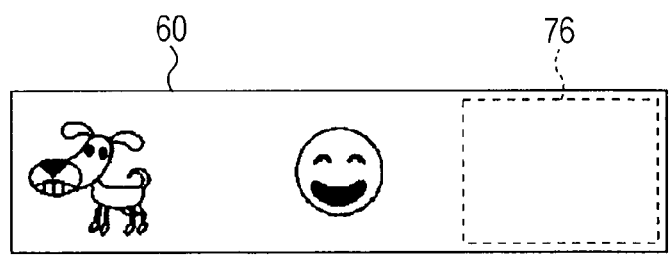
FIG. 13 is a diagram schematically illustrating the method for scrolling a panoramic image.

In step S30, the end of the panoramic image is detected. More specifically, after shifting the extraction coordinates in step S29, the control microcomputer 55 determines whether the display area reaches the upper, lower, left, or right end of the panoramic image. For example, if a display area 76 reaches an end of the panoramic image 60 shown in FIG. 13 ("TRUE" in step S30), the processing proceeds to step S27, where the subsequent panoramic image is read. However, if the display area 76 does not reach an end of the panoramic image 60 ("FALSE" in step S30), the processing proceeds to step S25, where it is determined whether the playback stop button is pressed.

As described above, according to the playback control apparatus 50, when a user continuously performs scroll playback of a plurality of panoramic images, the user can efficiently look at the panoramic images that the user desires in a short time.

More specifically, assume that a user wants to capture the panoramic image 25 shown in FIG. 3A when the user starts capturing images. However, as shown in FIG. 3B, the object 27 is unintentionally captured immediately before they stop capturing images. In such a case, by appropriately changing the scroll playback direction or the scroll start point, the playback control apparatus 50 can prevent the panoramic image 26 from being played back by scrolling from the unwanted object 27.

In addition, according to the playback control apparatus 50, when the user wants to efficiently delete an image including the image of an unwanted object or human, the image including the object or human can be efficiently deleted by starting the scroll display in a direction opposite to the imaging direction. As described above, when a miss shot is deleted, the entire panoramic image can be deleted, or a partial image that the user specifies can be deleted.

Furthermore, according to the playback control apparatus 50, by reducing the scroll speed while an image that the user wants to look at carefully is being displayed (e.g., the image of the face), the user can enjoy looking at the panoramic image without frustration.

The series of the above-described processes according to the present embodiment can be executed by hardware, software, or a combination of the two. In the case where the above-described series of processes are performed using software, a program describing the sequence of the processes can be installed in a memory of a computer embedded in dedicated hardware or a general-purpose computer that can perform a variety of processes. Subsequently, the series of the above-described processes can be executed.

For example, the program can be pre-recorded in a recording medium, such as a hard disk or a ROM. Alternatively, the program can be temporarily or permanently stored (recorded) in a removable disk, such as a flexible disk, a CD-ROM (compact disk-read only memory), an MO (magneto optical) disk, a DVD (digital versatile disc), a magnetic disk, or a semiconductor memory. Such a removable disk can be provided in the form of so-called package software.

In addition to installing the program in a computer from the above-described removable recording medium, the program can be installed on a computer as follows. The program is transferred from a download site to the computer wirelessly or using a network (e.g., a local area network (LAN) or the Internet). The computer receives the transferred program. Thus, the program can be installed in an internal recording medium, such as a hard disk. In addition, the various processes described in the embodiment can be executed not only in the above-described sequence, but also in parallel or independently. In addition, in the present embodiment, the term "system" refers to a logical combination of a plurality of devices; the plurality of devices is not necessarily included in one body.

The present application contains subject matter related to that disclosed in Japanese Priority Patent Application JP 2008-132319 filed in the Japan Patent Office on May 20, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A playback control apparatus comprising:
    a memory;
    a recording unit configured to record, in association with a panoramic image generated by assembling a plurality of image data items converted from a plurality of images captured during a time period from when a panoramic image capture is started to when the panoramic image capture is ended and input through a lens system, one of an imaging direction of the panoramic image during the time period from when the panoramic image capture is started to when the panoramic image capture is ended and coordinate information of an object detected by extracting features of the panoramic image;
    an imaging direction detecting unit configured to detect the imaging direction, that excludes amounts of movement greater than or equal to a predetermined movement value and that encodes the detected imaging direction into codes specifying a plurality of directions, the plurality of directions being upward, downward, left, and right directions; and
    a scroll direction determining unit configured to determine a scroll direction in which the panoramic image is played back on the basis of one of the imaging direction and the coordinate information.

2. The playback control apparatus according to claim 1, further comprising:
    a scroll start point determining unit configured to determine, on the basis of one of the imaging direction and the coordinate information, a scroll start point at which playback of the panoramic image is started.

3. The playback control apparatus according to claim 2, wherein the recording unit records, in association with the panoramic image, the coordinate information based on the face image of the object detected from the image data as the coordinate information.

4. The playback control apparatus according to claim 3, wherein, when the imaging direction and the coordinates of the face image are associated with the panoramic image, the scroll start point determining unit determines the scroll start point on the basis of the coordinates of the face image.

5. The playback control apparatus according to claim 3, wherein, when the coordinates of a plurality of face images are associated with the panoramic image and if weight information regarding the coordinates of the face images is recorded, the scroll start point determining unit determines the scroll start point on the basis of the coordinates of the face image having the highest weight.

6. The playback control apparatus according to claim 1, wherein the recording unit records coordinates of a face image of the object detected in the image data as the coordinate information in association with the panoramic image.

7. The playback control apparatus according to claim 6, wherein, when the imaging direction and the coordinates of the face image are associated with the panoramic image, the scroll direction determining unit determines the scroll direction on the basis of the coordinates of the face image.

8. The playback control apparatus according to claim 6, wherein, when the coordinates of a plurality of face images are associated with the panoramic image and if weight information regarding the coordinates of the face images is recorded, the scroll direction determining unit determines the scroll direction on the basis of the coordinates of the face image having the highest weight.

9. The playback control apparatus according to claim 1, further comprising:
    a scroll speed determining unit configured to determine, on the basis of the coordinate information, a scroll speed used when the panoramic image is played back.

10. The playback control apparatus according to claim 1, wherein the imaging direction detecting unit is further configured to detect the imaging direction during the time period from when the panoramic image capture is started to when the panoramic image capture is ended based on at least one of a motion vector between neighboring image data items of the plurality of image data items and an angular acceleration sensor.

11. An image pickup apparatus comprising:
    a memory;
    an image pickup unit configured to convert an image input through a lens system into image data;
    a stitching unit configured to generate a panoramic image from a plurality of the image data items of images captured during a time period from when a panoramic image capture is started to when the panoramic image capture is ended;
    an imaging direction detecting unit configured to detect an imaging direction during the time period from when a panoramic image capture is started to when the panoramic image capture is ended;
    a clock unit configured to detect image capture time information regarding image capture times of the panoramic image; and
    a recording unit configured to record, in association with the panoramic image generated by the stitching unit, the image capture time information detected by the clock unit and the imaging direction detected by the imaging direction detecting unit during the time period from when the panoramic image capture is started to when the panoramic image capture is ended,
    wherein the imaging direction detecting unit excludes amounts of movement greater than or equal to a predetermined movement value and encodes the detected imaging direction into codes specifying a plurality of directions, the plurality of directions being upward, downward, left, and right directions.

12. The image pickup apparatus according to claim 11, further comprising:
    a motion vector detecting unit configured to detect a motion vector between every two neighboring image data items of the plurality of image data items;
    wherein the imaging direction detecting unit detects the imaging direction based on the motion vector between every two neighboring image data items of the plurality of image data items detected by the motion vector detecting unit, and detects the imaging direction during the time period from when the panoramic image capture is started to when the panoramic image capture is ended based on at least one of the motion vector between neighboring image data items of the plurality of image data items and an angular acceleration sensor.

13. The image pickup apparatus according to claim 11, wherein the clock unit detects the image capture start time and the image capture end time as the image capture time information.

14. The image pickup apparatus according to claim 11, further comprising:
- a coordinate information detecting unit configured to detect coordinate information of an object by extracting features of the object included in the image data;
- wherein the recording unit records the coordinate information detected by the coordinate information detecting unit in association with the panoramic image generated by the stitching unit.

15. The image pickup apparatus according to claim 11, wherein the neighboring image data items of the plurality of image data items are adjacent image data items.

16. A method for capturing an image, comprising the steps of:
- converting an image input through a lens system into image data;
- generating a panoramic image from a plurality of the image data items of images captured during a time period from when a panoramic image capture is started to when the panoramic image capture is ended;
- detecting image capture time information regarding image capture times of the panoramic image;
- detecting an imaging direction during the time period from when a panoramic image capture is started to when the panoramic image capture is ended; and
- recording, in association with the generated panoramic image, the image capture time information and the imaging direction during the time period from when the panoramic image capture is started to when the panoramic image capture is ended,
- wherein, in the detecting the imaging direction, amounts of movement greater than or equal to a predetermined movement value are excluded and the detected imaging direction is encoded into codes specifying a plurality of directions, the plurality of directions being upward, downward, left, and right directions.

17. The method for capturing an image according to claim 16, wherein the detecting the imaging direction is performed during the time period from when the panoramic image capture is started to when the panoramic image capture is ended is based on at least one of a motion vector between neighboring image data items of the plurality of image data items and an angular acceleration sensor.

18. A playback control method comprising the steps of:
- recording, in association with a panoramic image generated by assembling a plurality of image data items converted from a plurality of images captured during a time period from when a panoramic image capture is started to when the panoramic image capture is ended and input through a lens system, one of an imaging direction of the panoramic image during the time period from when the panoramic image capture is started to when the panoramic image capture is ended and coordinate information of an object detected by extracting features of the panoramic image; and
- detecting the imaging direction, excluding amounts of movement greater than or equal to a predetermined movement value, and encoding the detected imaging direction into codes specifying a plurality of directions, the plurality of directions being upward, downward, left, and right directions; and
- determining a scroll direction in which the panoramic image is played back on the basis of one of the imaging direction and the coordinate information.

19. The playback control method according to claim 18, wherein the detecting the imaging direction is performed during the time period from when the panoramic image capture is started to when the panoramic image capture is ended based on at least one of a motion vector between neighboring image data items of the plurality of image data items and an angular acceleration sensor.

* * * * *